United States Patent
Linnakangas et al.

(10) Patent No.: US 10,616,237 B2
(45) Date of Patent: *Apr. 7, 2020

(54) TRUST RELATIONSHIPS IN A COMPUTERIZED SYSTEM

(71) Applicant: SSH Communications Security OYJ, Helsinki (FI)

(72) Inventors: Tommi Linnakangas, Helsinki (FI); Marko Teiste, Riihimäki (FI); Antti Huima, Espoo (FI); Tatu J. Ylonen, Espoo (FI)

(73) Assignee: SSH Communications Security OYJ, Helsinki (FI)

( * ) Notice: Subject to any disclaimer, the term of this patent is extended or adjusted under 35 U.S.C. 154(b) by 26 days.

This patent is subject to a terminal disclaimer.

(21) Appl. No.: 15/977,297

(22) Filed: May 11, 2018

(65) Prior Publication Data

US 2018/0262515 A1    Sep. 13, 2018

Related U.S. Application Data

(63) Continuation of application No. 15/423,830, filed on Feb. 3, 2017, now Pat. No. 10,009,354, which is a
(Continued)

(51) Int. Cl.
*H04L 29/06* (2006.01)
*G06F 16/00* (2019.01)
(Continued)

(52) U.S. Cl.
CPC .......... *H04L 63/105* (2013.01); *G06F 16/00* (2019.01); *G06F 21/552* (2013.01); *H04L 9/088* (2013.01);
(Continued)

(58) Field of Classification Search
CPC ... H04L 63/105; H04L 63/0442; H04L 63/06; H04L 63/061; H04L 63/08; H04L 63/168;
(Continued)

(56) References Cited

U.S. PATENT DOCUMENTS

| 5,887,063 A | 3/1999 | Varadharajan et al. |
| 6,851,113 B2 | 2/2005 | Hemsath |

(Continued)

FOREIGN PATENT DOCUMENTS

| WO | 2013009621 A1 | 1/2013 |
| WO | 2013093209 A1 | 6/2013 |

OTHER PUBLICATIONS

Written Opinion of Application No. PCT/FI2012/051294, dated Apr. 12, 2016.
(Continued)

*Primary Examiner* — Michael S McNally
(74) *Attorney, Agent, or Firm* — Banner & Witcoff, Ltd.

(57) ABSTRACT

Methods and apparatuses for a computerized system are disclosed. A data processing device receives information from at least one source of log information in the computerized system and detects, based at least in part on said received log information, at least one security protocol related event at a first host device, the at least one security protocol related event being initiated by a second host device. Information is then stored for determination of a trust relationship record based on the detected at least one security protocol related event and information of the second host device.

20 Claims, 11 Drawing Sheets

Related U.S. Application Data continuation of application No. 15/072,669, filed on Mar. 17, 2016, now Pat. No. 9,602,478, which is a continuation of application No. 14/324,298, filed on Jul. 7, 2014, now Pat. No. 9,319,396.

(60) Provisional application No. 61/843,809, filed on Jul. 8, 2013.

(51) Int. Cl.
*H04L 9/08* (2006.01)
*H04L 9/30* (2006.01)
*H04L 9/32* (2006.01)
*G06F 21/55* (2013.01)
*H04L 9/06* (2006.01)

(52) U.S. Cl.
CPC .............. *H04L 9/0866* (2013.01); *H04L 9/30* (2013.01); *H04L 9/32* (2013.01); *H04L 63/0442* (2013.01); *H04L 63/06* (2013.01); *H04L 63/061* (2013.01); *H04L 63/08* (2013.01); *H04L 63/168* (2013.01); *H04L 63/20* (2013.01); *H04L 9/0643* (2013.01)

(58) Field of Classification Search
CPC ....... H04L 63/20; H04L 9/0866; H04L 9/088; H04L 9/0643; G06F 16/00; G06F 21/552
USPC .......................................................... 726/1
See application file for complete search history.

(56) References Cited

U.S. PATENT DOCUMENTS

| | | | |
|---|---|---|---|
| 7,653,810 B2 | 1/2010 | Thornton et al. | |
| 8,015,594 B2 | 9/2011 | Salowey et al. | |
| 8,135,763 B1* | 3/2012 | Compton | G06F 16/122 707/822 |
| 8,214,844 B2 | 7/2012 | Grover | |
| 8,539,562 B2 | 9/2013 | Bolik et al. | |
| 9,319,396 B2 | 4/2016 | Linnakangas et al. | |
| 9,602,478 B2 | 3/2017 | Linnakangas et al. | |
| 2002/0161604 A1 | 10/2002 | Kardos et al. | |
| 2003/0033521 A1 | 2/2003 | Sahlbach | |
| 2005/0081029 A1 | 4/2005 | Thornton et al. | |
| 2006/0206922 A1 | 9/2006 | Johnson et al. | |
| 2006/0248082 A1 | 11/2006 | Raikar et al. | |
| 2006/0259950 A1 | 11/2006 | Mattsson | |
| 2007/0027929 A1* | 2/2007 | Whelan | G06F 16/172 |
| 2007/0083665 A1 | 4/2007 | Miao | |
| 2008/0133376 A1 | 6/2008 | Hill | |
| 2008/0222416 A1 | 9/2008 | Kiwimagi et al. | |
| 2009/0138703 A1 | 5/2009 | Schneider | |
| 2010/0235635 A1 | 9/2010 | Kshirsagar et al. | |
| 2011/0038482 A1 | 2/2011 | Singh et al. | |
| 2011/0185055 A1 | 7/2011 | Nappier et al. | |
| 2011/0302400 A1 | 12/2011 | Maino et al. | |
| 2012/0151563 A1 | 6/2012 | Bolik et al. | |
| 2012/0204032 A1 | 8/2012 | Wilkins et al. | |
| 2013/0111561 A1 | 5/2013 | Kaushik | |
| 2013/0117554 A1 | 5/2013 | Ylonen | |
| 2013/0298192 A1 | 11/2013 | Kumar et al. | |
| 2014/0317409 A1 | 10/2014 | Bartok et al. | |
| 2015/0242594 A1 | 8/2015 | Harjula et al. | |

OTHER PUBLICATIONS

"An SSH Key Management System: Easing the pain in Management Key/User/Account Association", International Conference on Computing in High Energy and Nuclear Physics, Journal of Physics: Conference Series 119, IOP Publishing, 2008 (pp. 1-6).

International Search Report of Application No. 14175776.5-1870, dated Nov. 13, 2014.

Sep. 23, 2015 U.S. Non-Final Office Action—U.S. Appl. No. 14/319,319.

An SSH Key Management System: Easing the Pain of Managing Key/User/Account Associates, International Conference on Computing in High Energy and Nuclear Physics, Journal of Physics: Conference Series 119, IOP Publishing, 2008, 6 pages.

Venafi Encryption Director—SSH Key Management Guide, Venafi, Inc. Jul. 27, 2011, 114 pages.

StoneGate 5.0 Firewall/VPN Evaluator's Guiode, Stonesoft, Secure Information Flow, 2009, 13 pages.

Key Management Interoperability Protocol (KMIP) Addressing the Need for Standardization in Entgerprise Key Management, Version 1, May 20, 2009, 22 pages.

SSH Tectia, SSH Tectia ® Manager 6.1 Product Description, Dec. 15, 2010, 70 pages.

Module SSH Auth Patterns—Puppet, Puppet Labs, Dec. 29, 2009, 10 pages.

Kent, Greg: Unsecured SSH—The Challenge of Managing SSH Keys and Association, SecureIT Whitepaper, 2010, 12 pages.

Dell-Michael, Setting up Certificate Authority Keys with OpenSSH version 5.4+, Sep. 8, 2011, 3 pages.

Puppet SSH: Auth Module Source Code, Downloaded from Sourceforge Apr. 3, 2013, 15 pages.

XP-002342178, Applied Cryptography, Second Edition, Passage, Jan. 1, 1996, Applied Cryptography: Protocols, Algorithms and Source Code in C, John Wiley & Sons, New York, 6 pages.

European Examination Report of EP Application No. 14 175 776.5-1218 dated Jun. 27, 2018.

U.S. Appl. No. 15/423,830, filed Feb. 3, 2017.

Napier, James A., "Secure Automation: Achieving Least Privilege with SSH, Sudo and Setuid," 2004 LISA XVIII, Nov. 14-19, 2014, Atlanta, Georgia, retrieved Feb. 9, 2019 from https://www.usenix.org/legacy/event/lisa04/tech/full_papers/napier/napier.pdf, 10 pages.

Thorpe, Christopher, "SSU Extending SSH for Secure Root Administration," Proceeding of the Twelfth Systems Administration Conference (LISA '98), Dec. 6-11, 1998, Boston, Massachusetts, retrieved Feb. 9, 2019 from http://static.usenix.org/event/lisa98/full_papers/thorpe/thorpe.pdf, 11 pages.

* cited by examiner

TRUST RELATIONSHIPS IN A COMPUTERIZED SYSTEM

CROSS-REFERENCE TO RELATED APPLICATIONS

This application is a continuation of U.S. application Ser. No. 15/423,830, filed on Feb. 3, 2017, entitled "TRUST RELATIONSHIPS IN A COMPUTERIZED SYSTEM," which is a continuation of U.S. Pat. No. 9,602,478, issued on Mar. 21, 2017, entitled "TRUST RELATIONSHIPS IN A COMPUTERIZED SYSTEM," which is a continuation of U.S. Pat. No. 9,319,396, issued on Apr. 19, 2016, entitled "TRUST RELATIONSHIPS IN A COMPUTERIZED SYSTEM, which claims the benefit of provisional U.S. Application Ser. No. 61/843,809, filed Jul. 8, 2013, entitled TRUST RELATIONSHIPS IN A COMPUTERIZED SYSTEM. Each of the above-mentioned patent applications is incorporated by reference herein in its entirety.

TECHNICAL FIELD

This invention relates to trust relationships in a computerized system. The trust relationships can associate for example with access control and encryption. Certain embodiments enable discovering, cataloguing, and analyzing access control rights based on cryptographic keys and their use in possibly heterogeneous computer networks.

BACKGROUND

It is common to implement access control, confidentiality, and data integrity within computer networks by means of cryptography. A common solution is to use end-to-end encryption, i.e., to cryptographically protect sessions initiated by a user or a computer program and terminated at a host device such as a server, a computer or other data processing device connected to a computer network. A network host may offer information resources, services, and applications to users or other nodes on the network. For instance, the SSH-2 (Secure Shell 2) protocol implements end-to-end encryption. SSH-2, among other security protocols, can allow users to authenticate themselves by using public-key cryptography.

In public key cryptography authentication schemes, keys are created in pairs comprising a private key and a public key. A user who wants to be authenticated has to demonstrate controlling or possessing a private key, without disclosing the private key itself. The host towards which the user is authenticating is configured to accept the corresponding public key. When the user demonstrates being in possession of a private key whose public key counterpart is registered as a public key granting access on the destination host, the user is allowed some type of system access on the destination host.

This mechanism creates a relationship between the private key and the target host via the public key, as the target host allows some form of access by an entity (a human operator or a computer program) who can demonstrate possessing the private key. Such relationships are called trust relationships. A trust relationship between a private key and a host can be extended to include (a) the host on which the private key is stored; (b) the user who is considered to be in control of that private key, or a group of users; and (c) the services or a group of services that are enabled for the private key, which can include for example unrestricted shell access or restricted system operations.

Cryptographic protocols have been used to secure end-to-end communications and to provide access control within computer networks for several decades. Security-conscious organizations need to be able to discover and catalogue existing trust relationships (rights to access services and other resources) within their networks. A reason for this is that traditionally users are able to create new private-public key pairs and register them to grant access to resources, that is, to create trust relationships, without centralized review or logging of created relationships. Additionally, when persons leave from organizations, it can happen that trust relationships they have created, or were created for them, are left intact and even forgotten. Large organizations may have millions of trust relationships that are unknown, abandoned, or in some other form not accounted for.

The previously known methods for discovering trust relationships are based on scanning network hosts for private keys and for access-granting public keys. This approach can suffer from certain drawbacks. Scanning based operation can require the discovery process to have universal access to all hosts within the network, making the discovery process itself a security risk. Additionally, the process can be slow as all the file systems have to be scanned in search for cryptographic keys. Additionally, the process may not be robust enough, as keys can be stored in non-standard locations. The keys may also be scrambled or encrypted so that a discovery process may not be able to detect them. Additionally, the processing may create extra load on the computer network both in terms of network as well as CPU (central processing unit) use. Furthermore, the procedure may not help in direct discovery of usage or access patterns but may only reveal static relationships between stored private keys and access-granting public keys.

SUMMARY

In accordance with an aspect there is provided a method in a computerized system, comprising receiving at a data processing device information from at least one source of log information in the computerized system, detecting based at least in part on said received log information at least one security protocol related event at a first host device, the at least one security protocol related event being initiated by a second host device, and storing information for determination of a trust relationship record based on the detected at least one security protocol related event and information of the second host device.

In accordance with another aspect there is provided an apparatus comprising at least one processor, and at least one memory including computer program code, wherein the at least one memory and the computer program code are configured, with the at least one processor, to cause the apparatus to process log information received from at least one source of log information in a computerized system to detect, based at least in part on said received log information, at least one security protocol related event at a first host device, the at least one security protocol related event being initiated by a second host device, and store information for determination of a trust relationship record based on the detected at least one security protocol related event and information of the second host device.

In accordance with a further aspect a data processing device can identify a successful login to a first host device from a second host device using a public key identified by a fingerprint for authentication based on log information conveyed from the first host device, it is determined that at least one of the first host device and the second host device is not being managed by a management system, and a database is then updated to record that a key identified by the fingerprint is used outside the environment managed by the management system.

A non-transitory computer readable media for implementing the various aspects of the invention may also be provided.

DETAILED DESCRIPTION

Figure 1:
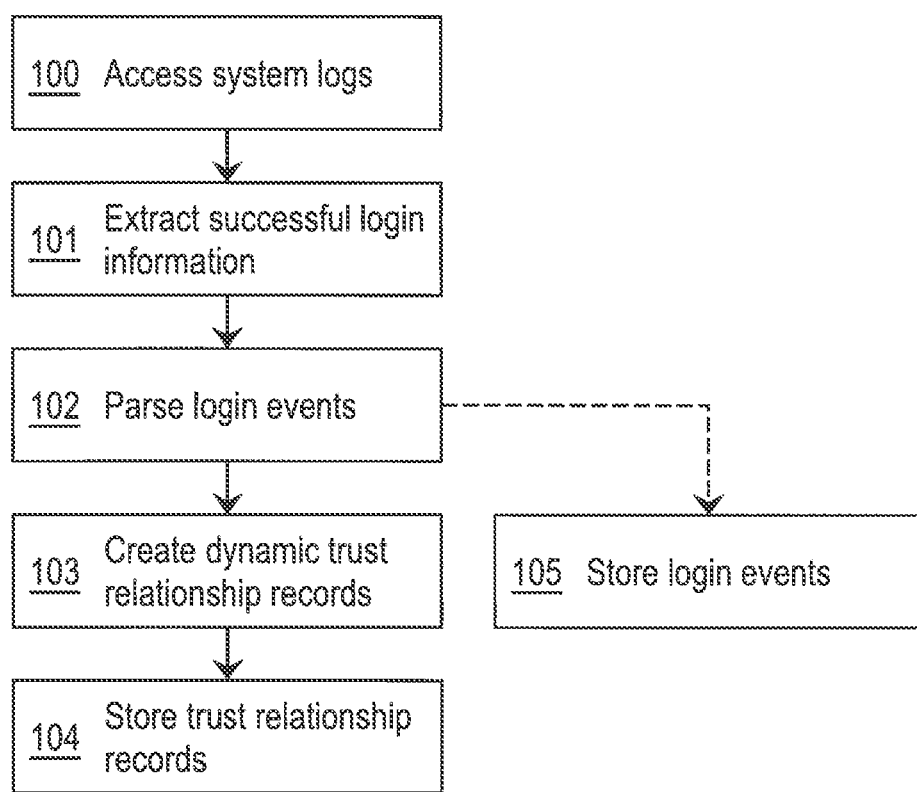
FIG. 1 illustrates accessing system logs and obtaining login events and trust relationships.

An example of operation in accordance with an embodiment will now be described with reference to FIG. 1. In this embodiment a data processing device such as an appropriately configured computer device first obtains log information (100) from appropriate sources of log information. The log information may be obtained, for example, from one or more network hosts that potentially run security protocol server processes. The log information can be analyzed to detect security protocol related events which comprise events such as a login to a server or a communication session routed through an intermediate node.

Log information can be accessed, for instance, by logging remotely into a network host with sufficient user privileges, such as administrator or root privileges, using a remote access mechanism such as SSH (Secure Shell), and reading log files on the local file system. Alternatively, or in addition, log information can be obtained by receiving one or more online streams of log events that are provided by a provider. The provider can be for example an SNMP (Simple Network Management Protocol) agent, an RFC 3164 compliant syslog server or forwarding service, or some type of an SIEM (Security Information and Event Management System) such as Splunk™. A log event stream can pertain to one or more network hosts, as it can be consolidated from multiple log event streams by a consolidating service. According to a possibility log information can be also found from one or more data bases containing such information. This is enabled within a computer network where a process is in place to write log information into databases. Such databases can be, for instance, SQL (Structured Query Language) databases such as Oracle™ or Postgres™, key-value databases such as BigTable™ or Berkeley™ DB, distributed large databases such as Cassandra™, or object databases such as GemStone/S™.

How log data is organized within one or more such databases can vary without having a material impact on any of the embodiments presented here. Different methods for accessing logs can be combined to cover for cases where different network hosts have different mechanisms for providing log information, for example because of technical restrictions or because of configuration.

One or more processes or services running on the network hosts can be configured so that the log information provided by them contains information about security protocol related events. For example, a server can provide information about successful logins over a security protocol, or a gateway or another intermediate node can provide information about security protocol sessions that are routed through it. For example, an OpenSSH server can be set into a verbose logging mode by setting the LogLevel configuration variable in the global sshd_config file to VERBOSE. In the verbose logging mode, the OpenSSH server provides log information about public key fingerprints and user IDs, that is, user names on the server computer that are used to log into the server.

Security protocols do not necessarily reveal the login name or other identity of the user on the originating network host. However, information about the login identity can be important, for instance, for auditing purposes. To mitigate that, a client can be configured to send over the value of the local user environment variable. If using the SSH as an example, this can be done by an OpenSSH™ client configured to send over the value of the local USER environment variable by setting the SendEnv configuration variable to USER in the global ssh_config file, and by adding USER to the allowed environment variables on the OpenSSH servers within the network by setting the AcceptEnv configuration variable to USER in the global sshd_config file, and then setting the verbosity level of server logging to DEBUG2 level. This causes the client to send over to the server the value of the USER environment variable on the originating host, which usually corresponds to the login name of the user on the originating host, and causes the server to provide the value within log information. It is worth noticing that the value of the USER environment variable is then overwritten by the server, causing no material change in the security properties provided by the security protocol.

A computer device can be configured to extract successful security protocol login events (101) from the obtained log information. This step can be based on scanning obtained log information. Scanning can be provided for example by using regular expressions or fixed string text search methods if log information is in textual form, regardless of whether log data was originally accessed by reading a textual file or by receiving management events. In some cases, log information can be structured across one or more multiple columns in a database. In those cases, regular expression or fixed string search can be performed by using such facilities provided by the database implementation, or by searching for specific values at specific columns if, for example, security protocol login events have a unique identifier within one of the columns within the database. It is noted that the purpose of these examples is not to limit how log information might be parsed, but rather to illustrate that it can be done.

For example, referring again to SSH, some versions of OpenSSH provide a log information line "Found matching RSA key: [key fingerprint]" when a user is attempting to log in using public key authentication, and another log information line "Accepted public key for [user name] from [host address] port [TCP/IP port] ssh2" if the public key authentication procedure was successful. These two lines can be found from a sequence of log lines by searching for matches for regular expressions "Found matching RSA key: ([0-9a-f:]+)" and "Accepted public key for (.*) from (.*) port ([0-9]+) ssh2", respectively. Alternatively, a fixed string search for "Found matching RSA key" and "Accepted public key" can be used instead of a regular expression search to locate the corresponding log information events, and then fixed string search can be used to locate the substrings that contain the user name, key fingerprint, and so on.

The security protocol can be, for example, any version of SSH (Secure Shell), any version of SSL (Secure Sockets Layer), any version of TLS (Transport Layer Security), any version of Secure Telnet, SFTP (SSH File Transfer Protocol), or FTPS (FTP over TLS/SSL), or a variant or further development of those or similar protocols without having a material impact on the applicability of the present invention.

A computer device can be configured to parse the login events (102) to obtain for each such event further information for the purposes of generating trust relationship records. For example, information of at least one of one or more public key fingerprints, an originating host device network address, an originating host device network TCP/IP port number, a destination host device network address, an authenticated user ID, an originating user ID, and a time stamp can be determined. Other useful information may also be obtained from the events depending on what information is made available by the servers providing the log information. Such information can be combined from multiple log events from one or more logs. For example, in the case of OpenSSH, two log events can be combined to be able to associate a key fingerprint with an originating host address with high probability, referring to the example presented earlier.

The public key fingerprints can be in one or more formats, for example, in the hexadecimal format specified in Section 4 of RFC 4716 by the Internet Engineering Taskforce, or in the Bubble Babble encoding. Commonly, a login event parsed from log information contains the public key fingerprint in one format only, and it is not necessarily possible to convert from one format to another as they can be based, for example, on different cryptographic one-way functions, such as MD5 or SHA-1.

The network addresses can be in numerical format (e.g. based on IPv4 or IPv6), or they can be qualified or relative DNS (Domain Name Service) names instead of being numerical. It also possible to use other addresses such as phone numbers or hardware addresses such as MAC (Media Access Control) addresses. In some cases, the address information can be combinations of two or more network addresses. This can be the case, for example, when a host is behind a gateway performing network address translation (NAT).

Information of the destination host address can be implicit. The information may have to be deduced based on information about the network host from which a given login event was received. For example, if log information is accessed by reading text files directly on individual hosts, then typically the destination host is the host itself and this information is not explicitly present in the log data.

In some systems, the destination host address obtained from log information can be the host address of a gateway instead of the real originating host, or it can change from time to time even when the physical originating host does not change. For example, if there is a gateway providing NAT (Network Address Translation) for connections through it, it is likely that the gateway's address appears as originating host address within log information. In some embodiments, log information is collected from NAT gateways and is used to map the gateway's address and the TCP/IP port number of a connection to a security protocol server to the address of the host behind the gateway that originated the connection and the original TCP/IP port number. In case there are multiple NAT gateways behind each other, this method may need to be repeated multiple times until the real originating host address has been found.

It is also possible to configure clients such as SSH clients as described above to pass on a specific environment variable that contains an identifier that uniquely identifies the originating host device. For example, a computer device can be used to generate a random identifier on each network host that is stored in an environment variable in a wrapper script that is executed whenever a user attempts to start the OpenSSH client. The OpenSSH servers are then configured to accept the environment variable, as described above. This method causes the unique identifier to appear in the log information provided by the servers, allowing identification of the originating host even when the security protocol connection traverses through one or more NAT gateways.

The same solution can be used in the case of dynamically changing IP (Internet Protocol) addresses, for example, when computers are configured to obtain their IP addresses using DHCP (Dynamic Host Configuration Protocol). Alternatively, log information from DHCP servers, or similar information obtained via other means such as by logging into the administrative interface of one or more DHCP servers and querying them for this information, can be used to associate IP addresses with hardware addresses such as MAC (Media Access Control) addresses. The obtained MAC addresses can be used to identify the originating hosts instead of their IP addresses.

A computer can be configured to form for every such parsed login event a dynamic trust relationship record (103). The record can be for example a data structure, a database row, or a combination of data structures or database rows. The record can comprise one or more public key fingerprints (or identification of key(s)), source device network address, destination device network address, authenticated user ID, originating user ID, and other available information. Some records may not contain all of this data. In some embodiments, certain records may also include a command executed using the trust relationship, files transferred using the trust relationship, and/or one or more timestamps when the trust relationship was used. The command and files may be associated with one or more of the timestamps.

A computer can be configured to store the formed dynamic trust relationship records (104) in a format that allows for querying them, along with the most recent login time stamps pertaining to the dynamic trust relationship records in, for example, one or more databases or one or more files.

Alternatively or in combination, a computer can store login events directly instead of translating them into dynamic trust relationship records (105). A difference is that one dynamic trust relationship relates to one or more login events, as there can be multiple login events (at different times, for instance) pertaining to a single dynamic trust relationship record.

Figure 2:
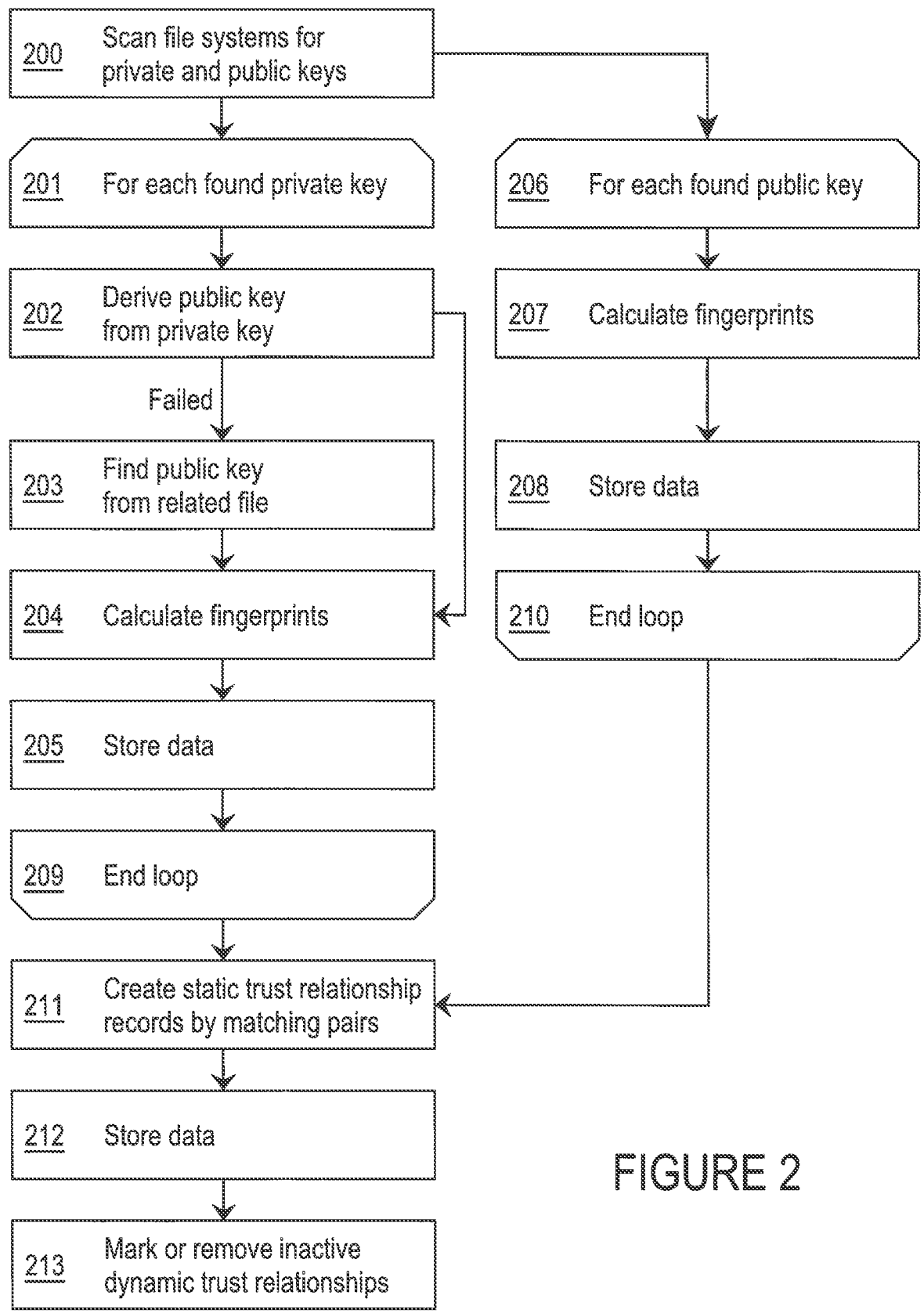
FIG. 2 illustrates scanning file systems for private and public keys and processing information obtained.

FIG. 2 relates to embodiments where a computer device is configured to further scan computer file systems within a computer network for private keys and public keys configured to grant access (200) based on information of the security protocol related events. The scanning can be periodic or provided on demand. This scanning can be implemented by making a remote connection to one or more specific network host devices, and then systematically traversing through those file system directories that are are determined to potentially contain private key files or public key files. Typically, the configuration files for a security protocol server available on a host, such as an SSH protocol server, for example, contain information about the locations at which public keys granting access can be located. Usually, private keys are stored at well-known locations such as users' home directories. Alternatively, the whole file system can be scanned, or a pre-existing index can be used to locate files, such as a locate database on UNIX variants.

Scanning can happen at regular intervals, once, or it can be triggered manually, or it can be triggered by observed security protocol connections or changes in dynamic trust relationships. For example, observing a connection from a host to another host authenticating a user with a specific public key, represented by its fingerprint, can trigger a localized scanning of only those locations on the destination host that are known to possibly contain access-granting public keys for that user.

A computer can then obtain, for each private key file found (201), one or more fingerprints of the corresponding public key (204). This can be accomplished by deriving the corresponding public key from the private key mathematically if all the necessary data for the private key is available (202). In some cases, private key files can be encrypted and protected by a password, a passphrase, or some other similar mechanism that makes it impossible for an automated scanner to be able to access the necessary key data. In those cases, it is possible to try to find another file from the same file system that is known, based on its name and relative location, to contain the corresponding public key with a high probability (203). For example, SSH-2 private keys are often stored in files named "id_rsa", and the corresponding public keys are stored often in the same directory as the private keys with the name "id_rsa.pub".

A computer for processing the log data can be configured to, for each private key for which the corresponding public key fingerprints have been able to be derived, store information about the private key in a database or some other form of storage (205). The information can comprise the network address of the host on which the key was found, the file system path to the private key, the owner ID for the file, the owner ID for the directory in which the file was contained, the time when it was scanned, the creation, last access and last modification time stamps as provided by the underlying operating system, if available, and all the fingerprints derived for the corresponding public key.

The computer can then also be configured, for each public key file found (206), to obtain one or more fingerprints of the key (207). Information about the public key can be stored in a database or some other form of storage (208). The information can comprise information such as the network address of the host on which the key was found, the file system path to the file containing the key, the owner ID for the file, the owner ID for the directory in which the file was contained, the time when it was scanned, creation, last access and last modification time stamps as provided by the underlying operating system, if available, and all the fingerprints derived for the public key.

Public keys can be stored in different formats and in different ways depending on which version and implementation of a security protocol server is in use. For example, it is possible that a single file contains multiple access-granting public keys, or that every access-granting public key is in a separate file but they have been collected in a common directory. The physical organization of public keys on a particular file system does have material impact on any of the embodiments presented here.

When private and public keys have been scanned and the corresponding loops terminate (209, 210), pairs of matching private key information and public key information can be looked for from the storage. For each pair of a private key and a public key that share at least one same public key fingerprint (if the keys agree on one of the fingerprints they should agree on all of them) a static trust relationship record (211) is created. The record can be a data structure, a database row, or a combination of data structures or database rows, comprising file system path(s) to said key(s), network address(es) of the host(s) on which they were found, the host of the private key being a source host and the host of the public key being a destination host, fingerprint(s) of the public key, and the owning user ID(s) for the key file(s). The computer can then store the created trust relationship records in a database or equivalent system (212).

A computer can be configured to mark those dynamic trust relationships that correspond to host pairs and key pairs for which there is no static trust relationship discovered as inactive. Information about when they were deemed to have become inactive based on the time when the file system scan was completed may be also included. Alternatively, such dynamic trust relationships can be removed from the database of dynamic trust relationships entirely (213).

Figure 3:
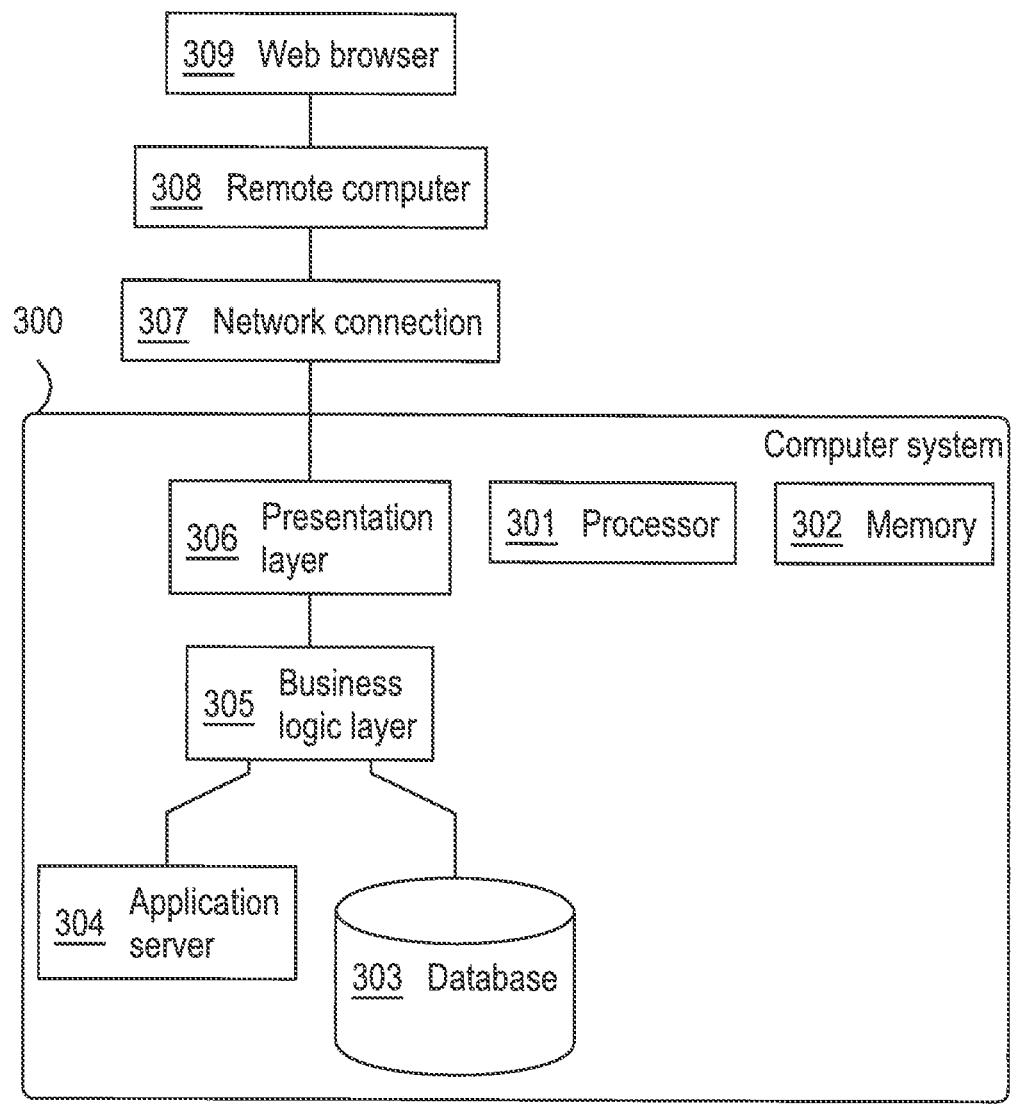
FIG. 3 illustrates a computer system presenting data to a user in a web browser.

In reference to FIG. 3, a computer system can be configured to present the generated dynamic trust relationship records or the static trust relationship records or both to a human user in a human-accessible form. This can be provided, for example, via a computer display, as a remotely accessible web service, through a textual console display, an application on a mobile phone, or a combination of different interfaces. In one embodiment, a computer system (300), comprising a processor (301) and a memory (302) runs a web application server (304), such as Apache Tomcat™. The application server serves a web application consisting of a business logic layer (305) and a presentation layer (306). The business logic layer is connected to a database containing trust relationship records (303) and provides data upon request to the presentation layer. The presentation layer renders the provided data into a human-readable form that is then served over a network connection (307), such as TCP/IP over Ethernet connection, to a remote computer (308). A web browser (309) can then be used to display the data to a human operator.

Figure 4:
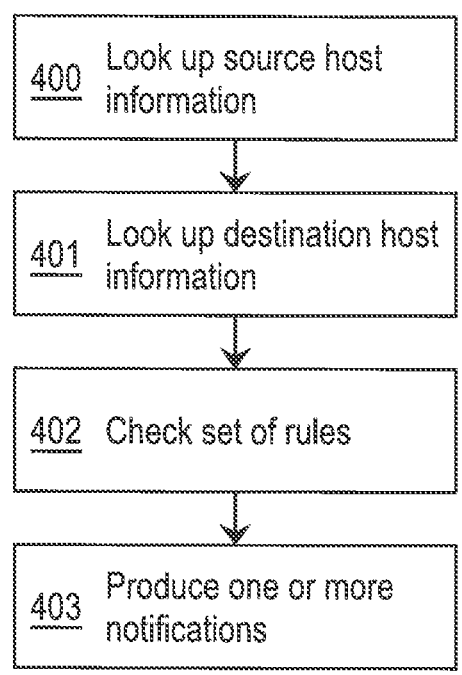
FIG. 4 illustrates producing notifications based on information obtained for a pair of computer hosts.

In reference to FIG. 4, some embodiments can process dynamic trust relationship records or static trust relationship records or both to detect possibly unauthorized, risky, or otherwise noteworthy trust relationships. In such embodiments, a computer is first used to look up, for one or more trust relationships, host information about the source host network address (400) and host information about the destination host network address (401) from a configuration management database, such as BMC Atrium™. A set of rules can be then consulted to check if a trust relationship from the source host to the destination host should trigger a notification (402). One or more notifications are then possibly produced (403).

The notifications can be alerts, reports, e-mails, phone calls, SMSes (short text messages), multimedia messages, displays in a GUI (Graphical User Interface), or audible signals. The notifications can trigger e.g. a plurality of audit events, management events, system log events, combinations thereof or be any other notifications similar in purpose. The notifications can be targeted to human operators, computers, services, processes, or combinations thereof. In some embodiments, mechanisms to display, filter, order, classify, save, or manage such notifications can be provided, as well as mechanisms to copy or reroute such notifications to other operators or processes based on either manual interaction or sets of predefined computer-processed rules, or both.

Figure 5:
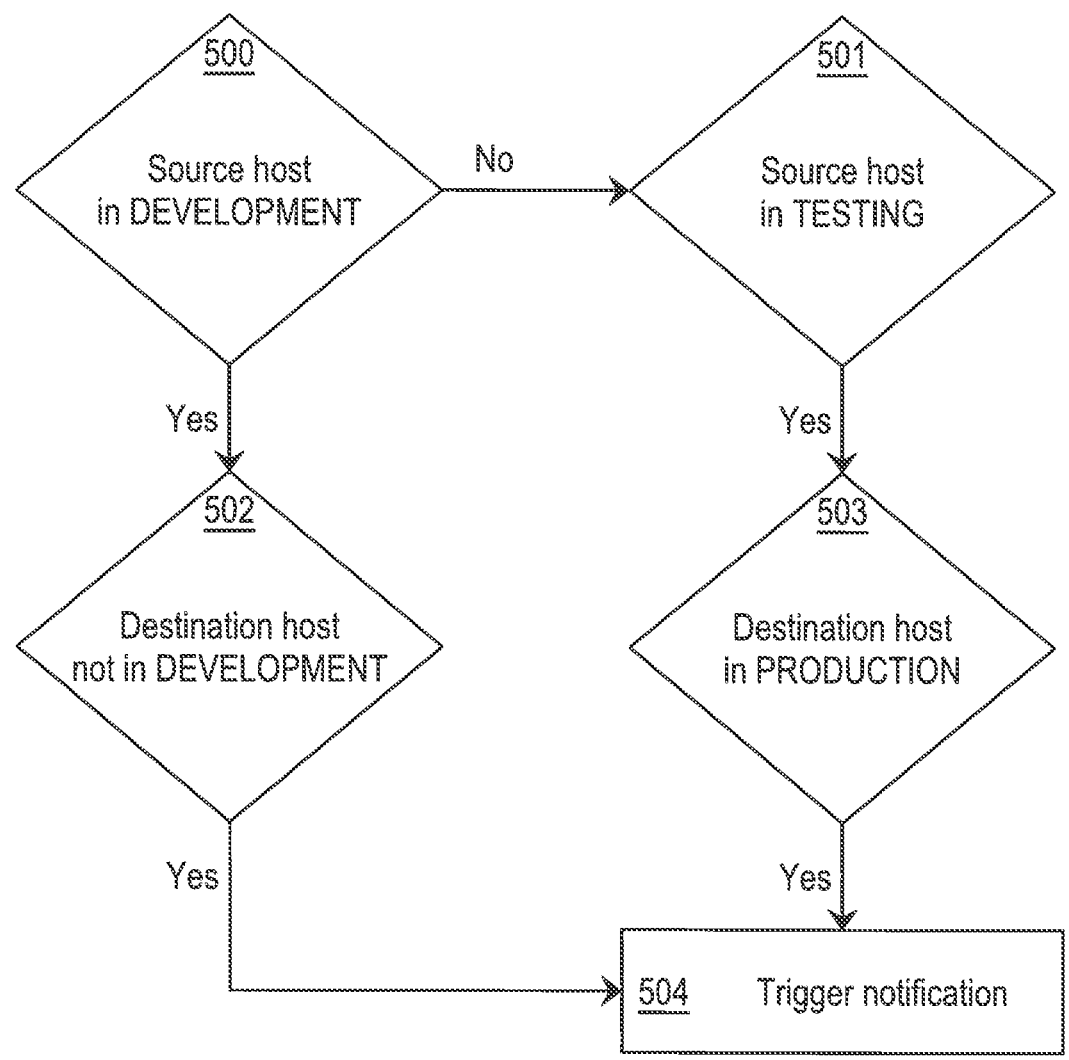
FIG. 5 illustrates a set of rules to trigger notifications based on host classifications.

In reference to FIG. 5, as an example, enterprise computer networks contain often separate network zones for, e.g., development, testing, and for production purposes. In such networks, it can be useful to prohibit remote access from development to other zones and from other zones to production zones. A set of rules can be defined to provide notifications for trust relationships that represent such prohibited access paths. A computer is first used to check if a source host belongs to the development zone (500). If it does, it is then checked if the destination host is not in the development zone (502). If that is true also, a notification is provided (504). Otherwise, it is checked if the source host is in the testing zone (501). If so, if the destination host is in the production zone (503), a notification is provided (504).

Figure 6:
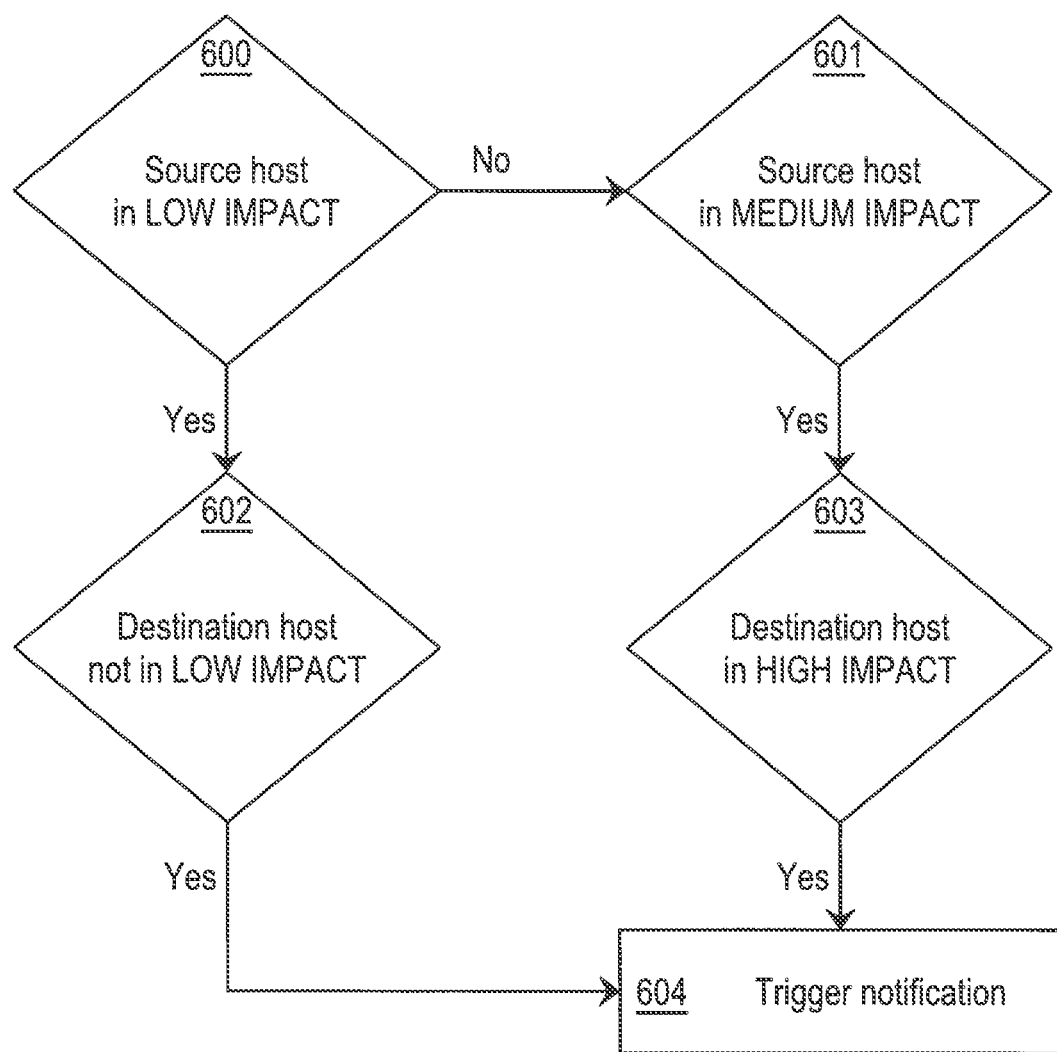
FIG. 6 illustrates a set of rules to trigger notifications based on host security classifications.

In reference to FIG. 6, as another example, security-sensitive organizations can divide their computer networks into low-impact, medium-impact, and high-impact zones. In such networks, it can be useful to prohibit access from a lower-impact zone to a higher-impact zone. A set of rules can be defined to provide notifications for trust relationships that represent such prohibited access paths. A computer can check first if a source host belongs to the low-impact zone (600). If it does, it is then checked if the destination host is not in the low-impact zone (602). If that is true also, a notification is provided (604). Otherwise, it is checked if the source host is in the medium-impact zone (601). If so, if the destination host is in the high-impact zone (603), a notification is provided (604).

Figure 7:
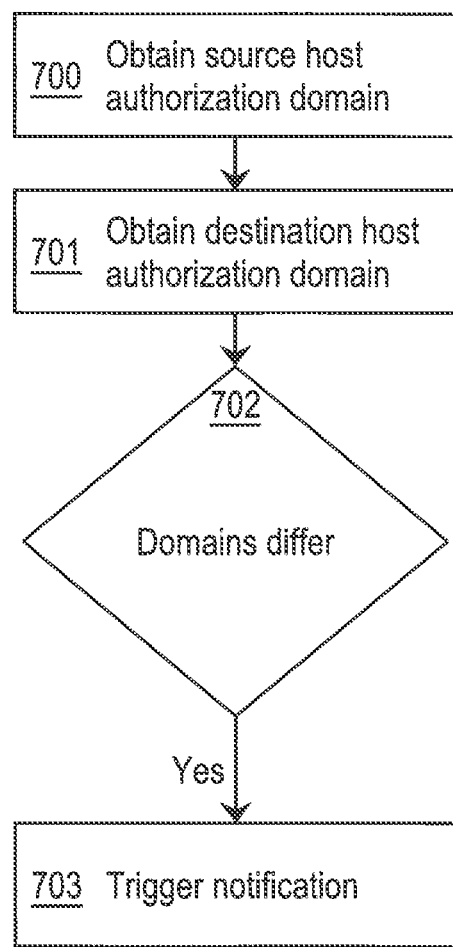
FIG. 7 illustrates a rule to trigger notifications based on host authorization domains.

In reference to FIG. 7, as yet another example, computer networks can be divided into multiple, distinct authorization domains and crossing authorization boundaries between those zones can be considered a violation of policy. A set of rules can be defined to trigger a notification whenever a static or a dynamic trust relationship is found whose source and destination hosts belong to different authorization domains, i.e., where the trust relationship crosses an authorization boundary. A computer is first used to obtain the authorization domain for the source host (700). A computer is then used to obtain the authorization domain for the destination host (701). The domains are compared (702), and if they differ, a notification is provided (703).

Figure 8:
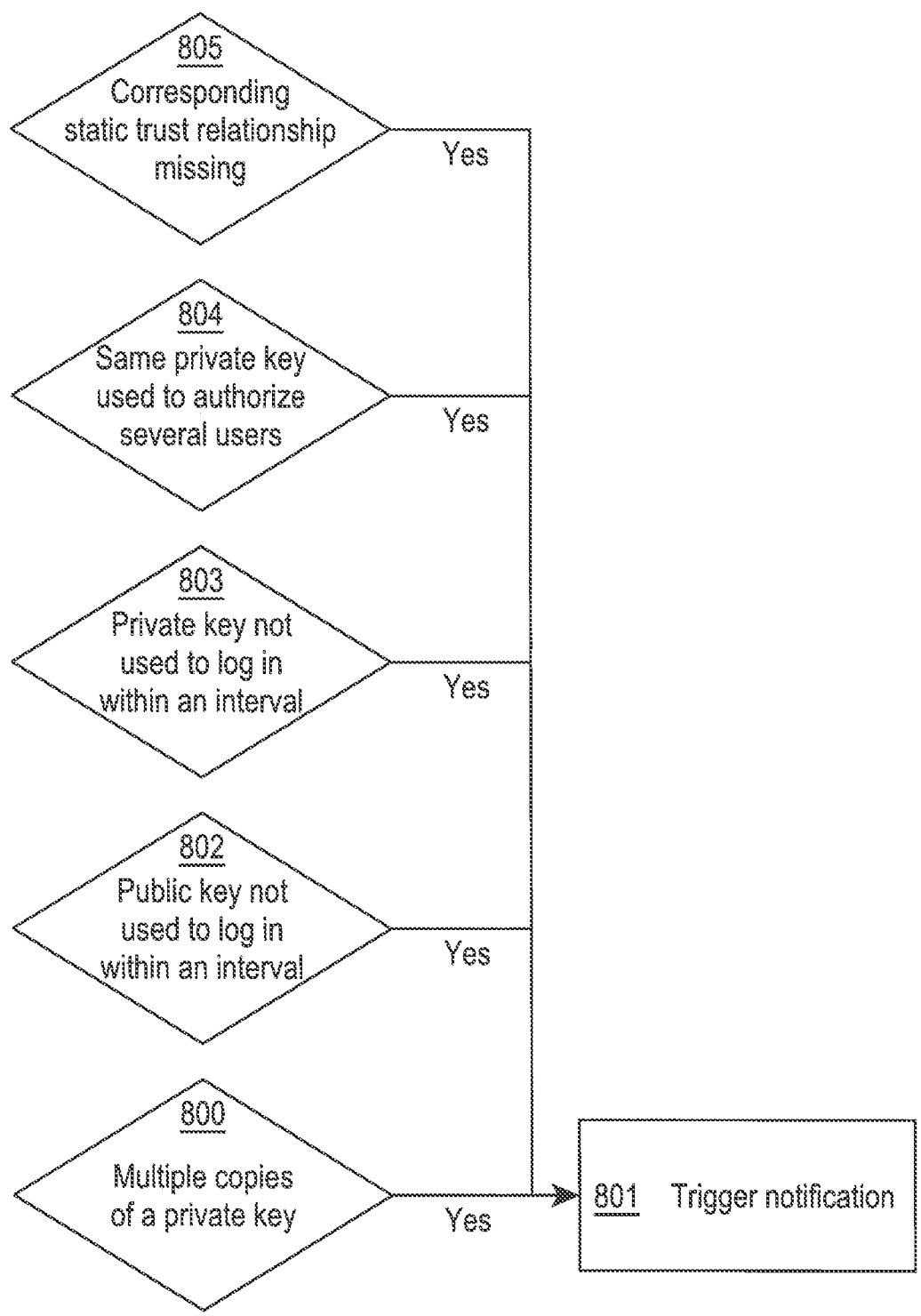
FIG. 8 illustrates a set of rules to trigger notifications based on various conditions.

In some embodiments, a computer can trigger notifications based on other conditions. In reference to FIG. 8, a computer can be configured to check if multiple copies of a single private key have been found (800). If so, a notification can be triggered (801), for example indicating that there has been an attack, that the key is mismanaged, that the key has been leaked, and/or that there has been an error in system administration.

A computer can be also configured to check if an access-granting public key found from a file system has not been used to log in during a time period or to invoke some other service (802), possibly indicating that the key corresponds to a stale or dead trust relationship, and to trigger a notification (801) in response.

Similarly, a computer can be configured to check if a private key has not been used to log in during a time period or to invoke some other service (803), possibly indicating a stale or dead trust relationship, and to trigger a notification (801) in response to finding such a key.

A private key that is used to authorize more than one different user can indicate a security policy violation or an attack. A computer can be configured to check for this (804) and to provide a notification consequently (801).

A computer can be configured to check for a dynamic trust relationship or login event without the corresponding static trust relationship (805) and to trigger a notification (801) if such is found, as this can mean that the private key used to authorize a user has been deliberately hidden, has been lost, or that there is an unwanted or unmanaged access path within the computer network.

A computer can be configured to check for a dynamic trust relationship or login event for which no approval matching the used authenticator (e.g., key identified by key fingerprint) can be found from a database of approved trust relationships or approved authorized keys.

A notification may be triggered if any such event is determined.

Figure 9:
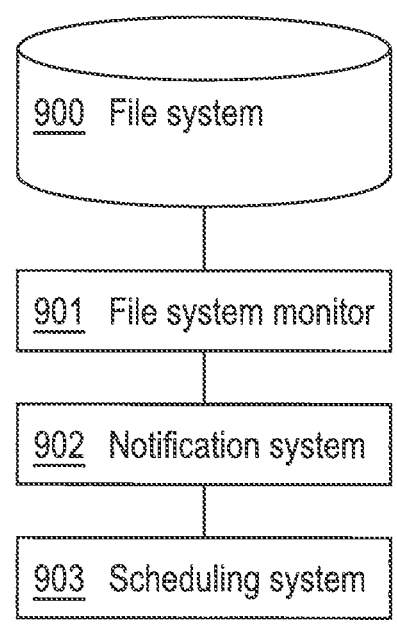
FIG. 9 illustrates an arrangement of systems to monitor file system changes and to schedule tasks based on monitored changes.

In reference to FIG. 9, in addition to scanning file systems as described before, it is also possible to scan file systems for public and private keys based on file system monitoring services. In an embodiment, one or more file systems (900) are monitored by one or more file system monitors (901). A file system monitor is a process that continuously observes file systems for file creation, file modification, and file deletion events. For example, on Linux computer systems, a kernel subsystem known as Inotify is such a process. On Windows™ computer systems with NTFS file systems, NTFS file system journal can be monitored to provide file monitoring.

File system monitoring apparatus (901) comprising one or more monitoring entities can provide notifications of aforementioned file system change events through a notification system (902). The notification system can be, for example, an API (application programming interface), a protocol, or a system log. The notifications can be initially filtered, for example, so that only notifications for public and private key files are provided, or only notifications for files that reside in locations where public and private keys are known to be located or where they should be located are provided. A scheduling system (903) is used, based on the notifications provided, to schedule full or partial file system scans as described earlier. For instance, a file containing access-granting public keys can be scheduled to be scanned when file system monitoring apparatus (901) has observed that the file has been changed.

Figure 10:
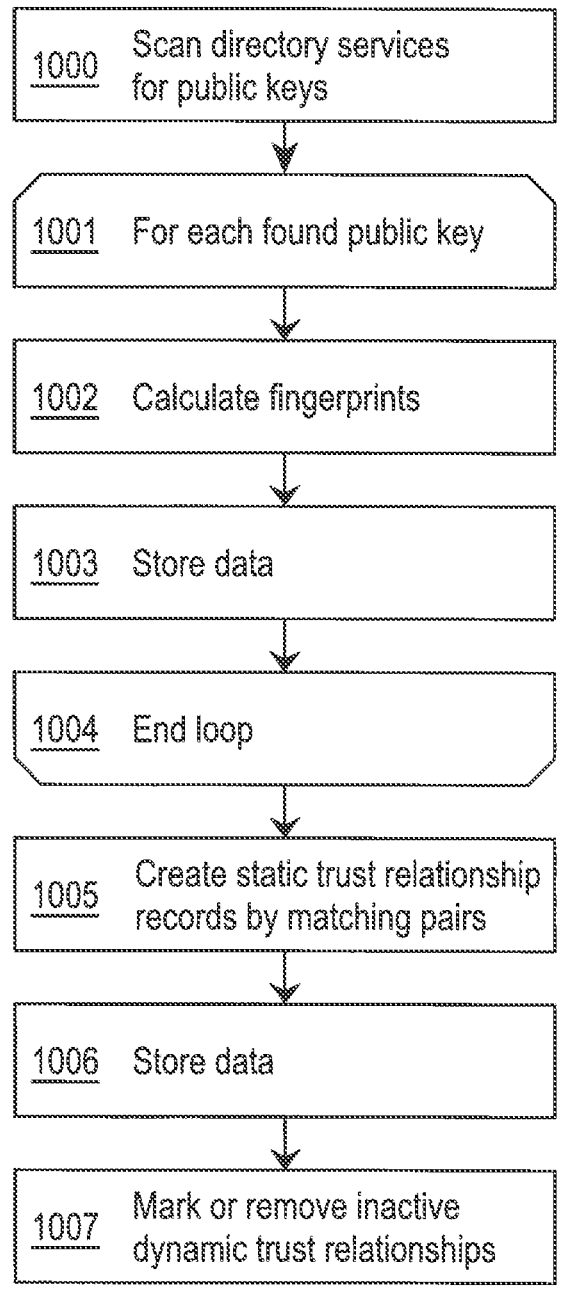
FIG. 10 illustrates scanning directory services for public keys and processing information obtained.

In reference to FIG. 10, similarly to the process of scanning file systems for public keys, it is also possible to scan directory services, such as AD (Active Directory) or LDAP (Lightweight Directory Access Protocol) directories for public keys in those cases where such directories are known to possibly contain access-granting public keys or references to/identifiers for such keys based on processing of the log data to determine security protocol related events. In an embodiment, a computer is configured to scan directory services for users and service accounts that have one or more access-granting public keys stored in their directory entries either in verbatim or represented by one or more of their fingerprints (1000). The choice of which users to scan can be based on existing dynamic trust relationships, that is, scanning those users that have been known to log in at least once, or organization parts, such as scanning the users within a development section, or some other criteria, or it is possible to scan full directories.

For each found public key (1001), a computer can then calculate the corresponding fingerprints (1002) and store in a database or some other form of storage information about the public key (1003). The information can comprise the identity of a user in whose directory record the key was found, the time when the record was scanned, all the fingerprints derived for the public key, and other information present in the directory record. For example, information such as the person's full name, rank, title, physical location, phone number, and e-mail address may be stored. Once the directory scanning has been completed (1004), a computer can be configured to combine the obtained information with otherwise obtained information about private keys, and create (1005) and store (1006) static trust relationship records or objects as described earlier. Inactive dynamic trust relationships (1007) can also be marked or removed as described earlier.

Figure 11:
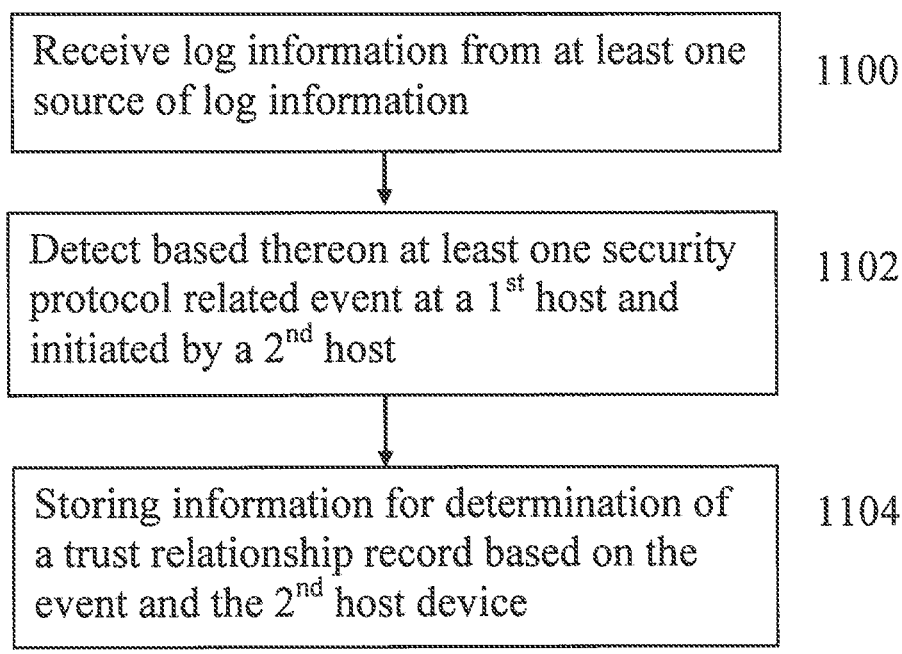
FIG. 11 illustrates an embodiment.

FIG. 11 shows a method according to the invention in a computerized system. In the method log information is received at 1100 from at least one source of log information. The information is analyzed at 1102 to detect, based at least in part on said received log information, at least one security protocol related event at a first host device, the at least one security protocol related event being initiated by a second host device. Information for use in determination of a trust relationship record based on the detected at least one security protocol related event and information of the second host device is then stored at 1104.

In accordance with an embodiment a device processing log data can identify a successful login to a first host device from a second host device using a public key identified by a fingerprint for authentication based on log information conveyed from the first host device. If it is determined that at least one of the first host device and the second host device is not managed by a management system, a database can be updated to record that a key identified by the fingerprint is used outside the environment managed by the management system.

In accordance with a more specific embodiment scanning for a cryptographic key associated with the security protocol related event based on the log information is provided.

The security protocol related event may comprise a login to a server or a communication session routed through an intermediate node.

The storing may comprise storing one of a trust relationship record provided based on the detected event and information of the detected event.

The log information may be analyzed to obtain at least one of the time of the security protocol related event, an user account associated with the first host device, an identifier of the first host device, an identifier of the second host device, a fingerprint identifying an authenticator used for authenticating the security protocol related event, and an authenticator used for authenticating the security protocol related event.

The log information may be analyzed to obtain at least one key used for authenticating the security protocol related event, where after at least one fingerprint identifying the key is determined for a key configured as granting access to at least one user account on at least one host, and the determined fingerprints are stored together with identification of the corresponding key, identification of a user account for which the corresponding key was configured as granting access, and an identification of a host or host equivalence group on which the corresponding key was configured as granting access to the user account, in a database as a key granting access to the user account on the at least one host.

Providing the trust relationship record may comprise scanning at least one host device or directory service for cryptographic keys that could be used as authenticators for users based on information of the detected at least one event, generating, for at least one such cryptographic key, at least one fingerprint, and storing the at least one fingerprint in a database together with identification of a user for which the cryptographic key can be used as an authenticator.

A localized scanning of locations known to potentially contain information of access granting public keys of the user may be triggered in response to detection of a connection from the second host device to the first host device by a user authenticated by a public key represented by its fingerprint.

Providing of a trust relationship record may comprise detecting a login to a first user account on the first host device and determining a fingerprint of a key used for authenticating the login, and in response thereto update of a database to indicate that a key corresponding to the fingerprint has been used for logging into the first user account on the first host device at the time of the login. A static trust relationship matching the first user account, the first host device, and the fingerprint may be identified and the database updated to indicate that the static trust relationship has been used at the time of the login.

In accordance with an embodiment a presentation or map presenting host devices originating connections is generated. The presentation can be limited to devices making most of the connections in the system, and/or to devices initiating a number of connections exceeding a threshold. The number of connections can be counted for a predefined period. Information of connection initiating devices can be used to determine and/or visualize devices that are likely to be in the possession of keys and/or a substantial number of keys. This can be used to improve the heuristic capabilities of the system.

In an embodiment, a distinguished name is extracted from log data, and a distinguished name from a certificate that is used for logging in is extracted from a log record and included in a dynamic trust relationship or login event. The distinguished name may be looked up from a directory to obtain additional information about the certificate owner.

In some embodiments, a computer can be configured to associate dynamic trust relationship records with information obtained from scanning directory services. It can be assumed that if the public key fingerprints within a dynamic trust relationship record match the fingerprints stored for a user found from a directory service, then that dynamic trust relationship represents one or more login events by that physical user from the designated source host to the designated destination host. In an embodiment, a computer is configured to find dynamic trust relationships for which no private key file has been found. Then the computer can check for every such relationship if a directory entry containing an access-granting public key or one or more of its fingerprints have been seen. If yes, the corresponding dynamic trust relationship record is marked to be "token-based". The "token-based" mark indicates that it is possible that the actual private key is stored on a cryptographic token, such as a smart card. If not, the corresponding dynamic trust relationship is marked as being "agent-based". The "agent-based" mark indicates that the private key is stored on an unknown location, potentially a remote computer, and is being potentially used through a key forwarding service such as the SSH Agent service. Other marks can be used instead, or some other way of associating the inferred information with the records.

Some embodiments can use also other information to infer whether a dynamic trust relationship should be assumed to be based on smart cards or other cryptographic tokens (token-based) or on the use of SSH agent services or other similar services (agent-based). For example, directory service entries can contain information about the cryptographic tokens available to the corresponding users, or the use of an SSH agent can be detected from system log information obtained from the source host.

A computer can be configured to analyze dynamic and static trust relationships obtained by any of the aforementioned methods, to calculate, derive, or estimate metrics and to make them available to users or computer services in human-readable form, such as text files, graphical plots, or spreadsheets, or computer-readable formats, such as database rows, XML files, plain text files, or binary encoded files.

In an embodiment, the computer is configured to calculate one or more of the following raw metrics:

The number of hosts into which logins are made using public-key authentication, that is, the number of hosts that appear as destination hosts in at least one dynamic trust relationship;

The number of service accounts into which logins are made using public authentication, that is, the number of dynamic trust relationships whose user IDs correspond to service accounts. Whether a user ID corresponds to a service account can be resolved, for instance, by a naming convention, or by looking up the login shell for the user ID, or by looking that information up from a directory service;

The number of human user accounts into which logins are made using public-key authentication, that is, the number of dynamic trust relationships whose user IDs correspond to human operators. Whether a user ID corresponds to a human operator can be resolved for instance by a naming convention, or looking up the login shell for the user ID, or by looking that information up from a directory service;

The number of production hosts, or development hosts, or test hosts, or low-impact hosts, or medium-impact hosts, or high-impact hosts, into which logins are made using public key authentication. These metrics can be calculated by collecting the destination hosts contained with dynamic trust relationship records, obtaining host classification from a configuration management database (e.g., BMC Atrium or HP Universal Configuration Management Database), and counting the number of hosts that have a specific host classification;

The number of connections from a first host classification to a second host classification, which can be calculated by obtaining host classification information as above and then counting the number of connections from any source host that belongs to the first host classification to any destination host that belongs to the second host classification. For instance, a computer can be used to calculate the number of connections from development hosts to test hosts, or from test hosts to production hosts, or from development hosts to production hosts, or from low-impact systems to medium-impact systems, or from medium-impact systems to high-impact systems, or from low-impact systems to high-impact systems, or from hosts belonging to one authorization domain to hosts belonging to another authorization domain, or to hosts known to be audited or collecting sufficient log data for analysis, or to hosts known not to be thus characterized, or connections from non-disaster-recovery hosts into disaster recovery hosts;

The number of connections from a first type of accounts to a second type of accounts, which can be obtained by, for every connection object stored, obtaining originating user ID, when available, and authenticated user ID, finding the account types for both user IDs as above, and then calculating the number of connections where the originating user ID belongs to the first type of accounts and the authenticated user ID belongs to the second type of accounts. For instance, a computer can be used to calculate the number of connections from any account type into privileged accounts, or from privileged to non-privileged, or from privileged to human operator accounts, or the number of connections to superuser accounts;

The number of connections from a first type of accounts to a second type of accounts that originate from a host belonging to a first host classification to a host belonging to a second host classification, a metric being a combination of the aforementioned types of metrics. For example, a computer can be used to calculate the number of connections from privileged accounts from hosts that are not identified as privileged access gateways in a configuration management database; and The number of connections into accounts that are known to collect session audit logs, or the number of connections into accounts that are known not to collect session audit logs. Both metrics can be calculated once it is known if a given account on a given host is configured to collect session audit logs. That information can be obtained, for instance, by reading local configuration files on that host, or from a database containing information about local network topology and the presence of separate audit gateways.

Additionally, a computer can be configured to derive, from one or more of any of the raw metrics presented above, time series for given time intervals, or one or more average values, median values, values of other fractiles, or moving averages, or interpolations or extrapolations, and other arithmetically derived metrics or series of metrics.

A computer can be also configured to present together with any of the raw orderived metrics a list of hosts, users, host classifications, accounts, or account types, or combinations thereof, included in a metric or combination of metrics, or to allow a user to interactively drill down data behind any of the metrics, for instance, to obtain for each connection included in a metric, time of the login, destination host, user account, source host, originating user ID, public key fingerprints, and commands executed on destination host.

In an embodiment, a computer is configured to detect hosts that do not provide enough log information to be able to create, maintain, and/or delete dynamic trust relationship records based on log information, and this information is made accessible to certain users according to the principles described above. For example, a packet sniffer tool such as Wireshark™ or tcptrack™ can be used to detect TCP/IP connections made to known security protocol ports, such as the TCP/IP port 22 for SSH. A connection from a source host to a destination host at a known security protocol port that transmits a significant amount of data can be deemed to be a successful security protocol connection. If the destination host does not provide sufficient log information for such a connection, it can be deemed that the destination host has not been properly configured to provide such information. A significant amount of data means more data than what would typically amount to a failing login attempt.

Alternatively, the configuration files for security protocol servers can be scanned in the same manner as the key files and configuration files that do not properly configure enough log information to be produced or made available can be deemed to correspond to a server that is not providing enough log information.

A security protocol connection can originate from a host that is outside a local network and to which there is no administrative access, or it can terminate at such a host, or both, and at the same time the connection can still go through a local network whose hosts can be administered.

A protocol connection that is terminated at an outside host (host outside a managed network) terminates at a server whose log information is not available. In some embodiments, log information from routers or gateways at the network perimeter (boundary of a managed network) are accessed via the methods described above to obtain information about security protocol connections terminated outside the managed network. If information about the originator is available, such as originating host network address, or key fingerprint used for authentication, or user ID at the originating host, a dynamic trust relationship record is created as described above, with the outside network address used as the destination host address; this address is obtained from the gateway at the perimeter. The record is marked as denoting a connection terminating beyond the network perimeter.

A protocol connection that originated from an outside host terminates at a server whose log information can be available. In some embodiments, dynamic trust relationship records are created for such connections, with a mark denoting that the connection originated from outside the network perimeter.

In an embodiment, if it is detected that one or more endpoints of a protocol connection is outside the managed environment (which may here be interpreted as either outside the environment from which log data is obtained or outside the set of hosts from which keys are collected from the file system or otherwise obtained for constructing static trust relationships), the host(s) outside the environment may be marked as "external hosts", and the key(s) involved in such connection(s) may be marked as "external keys". External keys cannot typically be automatically rotated (changed), because a management system does not typically have the access to external hosts so that it could change keys on them.

In some embodiments, log information can be further collected from auditing gateways. A network can be configured so that all security protocol connections are forced to go through an auditing gateway, or so that only connections coming through an auditing gateway are accepted at a destination host. An auditing gateway may be provided with cryptographic credentials that allow it to masquerade as one or more destination hosts, allowing it to perform a managed man-in-the-middle attack and thus obtain information about secured connections that would not be otherwise available. Log information collected from such auditing gateways can be combined with other collected log information, or it can be used to lessen the need to collect log information elsewhere. For example, an auditing gateway can provide the same information about a security connection as the real destination host if the auditing gateway can masquerade as the destination host. In some embodiments, log information from auditing gateways can be thus used to supersede information available from security protocol servers.

In another embodiment, a computer system, consisting of a processor, a memory, and a network interface, can be configured to execute one or more of the methods described above or combinations thereof.

In another embodiment, a software product stored on a non-transitory computer-readable medium that provides computer-readable instructions can be configured to cause a computer to perform one or more of the methods described above or combinations thereof or provide such instructions for downloading or transmit such instruction to one or more other computers.

Alerts may be generated substantially identically for dynamic trust relationships, static trust relationships, and/or login events. Where one is described, the others are also implied as possibilities.

Many variations of the above described embodiments will be available to one skilled in the art. In particular, some operations could be reordered, combined, or interleaved, or executed in parallel, and many of the data structures could be implemented differently. When one element, step, or object is specified, in many cases several elements, steps, or objects could equivalently occur. Steps in flowcharts could be implemented, e.g., as state machine states, logic circuits, or optics in hardware components, as instructions, subprograms, or processes executed by a processor, or a combination of these and other techniques. Any action indicated as performed may instead be caused to be performed by another component or computer, and for any receiving there is understood to be corresponding sending and vice versa.

It is to be understood that the aspects and embodiments of the invention described in this specification may be used in any combination with each other. Several of the aspects and embodiments may be combined together to form a further embodiment of the invention, and not all features, elements, or characteristics of an embodiment necessarily appear in other embodiments. A method, an apparatus, or a computer program product which is an aspect of the invention may comprise any number of the embodiments or elements of the invention described in this specification. Separate references to "an embodiment" or "one embodiment" refer to particular embodiments or classes of embodiments (possibly different embodiments in each case), not necessarily all possible embodiments of the invention. The subject matter described herein is provided by way of illustration only and should not be construed as limiting.

A computer may be any general or special purpose computer, workstation, server, laptop, handheld device, smartphone, wearable computer, embedded computer, a system of computers (e.g., a computer cluster, possibly comprising many racks of computing nodes), distributed computer, computerized control system, processor, or other similar apparatus capable of performing data processing, and may have one or more processors, memories, and I/O ports of any particular type.

Apparatuses may be computers, but are not restricted to traditional computers. They may also be, for example, robots, vehicles, control systems, instruments, games, toys, or home or office appliances.

Computer-readable media can include, e.g., computer-readable magnetic data storage media (e.g., floppies, disk drives, tapes), computer-readable optical data storage media (e.g., disks, tapes, holograms, crystals, strips), semiconductor memories (such as flash memory, memristor memory, and various ROM and RAM technologies), media accessible through an I/O interface in a computer, media accessible through a network interface in a computer, networked file servers from which at least some of the content can be accessed by another computer, data buffered, cached, or in transit through a computer network, or any other media that can be accessed by a computer.

The foregoing description provides by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. All such and similar modifications of the teachings of this invention will still fall within the spirit and scope of this invention.

We claim:

1. A method for security protocol key management in a computerized system, comprising:
    monitoring at least one file system by at least one file system monitor apparatus comprising at least one hardware processor and at least one memory;
    determining, based on the monitoring by the at least one file system monitor apparatus, a change event in the at least one monitored file system; and
    performing, in response to the determining of the change event, a file system scan for determining at least one security protocol key in the at least one monitored file system.

2. The method according to claim 1, comprising generating a file system change notification in response to the determining of the change event.

3. The method according to claim 2, comprising providing the notification via a notification system comprising one of an application programming interface, a protocol, and a system log.

4. A method for key management in a computerized system, comprising:
    monitoring at least one file system by at least one file system monitor apparatus comprising at least one hardware processor and at least one memory;
    determining, based on the monitoring by the at least one file system monitor apparatus, a change event in the at least one monitored file system;
    generating a file system change notification in response to the determining of the change event;
    filtering the file system change notification; and
    performing, in response to the determining of the change event, a file system scan for determining at least one key in the at least one monitored file system.

5. The method according to claim 4, wherein the filtering allows the notification to proceed to the scanning step only if the notification comprises a notification relating to one of a public key file, a private key file, and a file residing in a location where information of keys is expected to be located.

6. A method for key management in a computerized system, comprising:
    monitoring at least one file system by at least one file system monitor apparatus comprising at least one hardware processor and at least one memory;
    determining, based on the monitoring by the at least one file system monitor apparatus, a change event in the at least one monitored file system;
    performing, in response to the determining of the change event, a file system scan for determining at least one key in the at least one monitored file system; and
    scheduling at least one scanning task in response to the determining of the change event.

7. The method according to claim 6, wherein the scanning task comprises at least one of a full file system scan, a partial file system scan, a scan for public keys, a scan for access-granting public keys, and a scan for private keys.

8. The method according to claim 1, comprising continuously monitoring the at least one file system.

9. The method according to claim 1, wherein the change event comprises at least one of a file creation event, a file deletion event and a file modification event.

10. An apparatus comprising at least one processor, and at least one memory including computer program code, wherein the at least one memory and the computer program code are configured, with the at least one processor, to cause the apparatus to:
    monitor at least one file system;
    determine, based on the monitoring, a change event in the at least one monitored file system; and
    perform, in response to the determined change event, a file system scan for determining at least one security protocol key in the at least one monitored file system.

11. The apparatus according to claim 10, configured to generate a file system change notification in response to the determined change event.

12. The apparatus according to claim 11, comprising a notification system configured to provide the notification, the notification system comprising one of an application programming interface, a protocol, and a system log.

13. An apparatus comprising at least one processor, and at least one memory including computer program code, wherein the at least one memory and the computer program code are configured, with the at least one processor, to cause the apparatus to:
    monitor at least one file system;
    determine, based on the monitoring, a change event in the at least one monitored file system;
    perform, in response to the determined change event, a file system scan for determining at least one key in the at least one monitored file system; and
    generate a file system change notification in response to the determined change event, the apparatus comprising a filter for filtering file system change notifications.

14. The apparatus according to claim 13, wherein the filter is configured to allow a file system change notification through only if the notification comprises a notification relating to one of a public key file, a private key file, and a file residing in a location where keys are expected to be located.

15. An apparatus comprising at least one processor, and at least one memory including computer program code, wherein the at least one memory and the computer program code are configured, with the at least one processor, to cause the apparatus to:
    monitor at least one file system;
    determine, based on the monitoring, a change event in the at least one monitored file system; and
    perform, in response to the determined change event, a file system scan for determining at least one key in the at least one monitored file system;
    the apparatus comprising a scheduling system for scheduling at least one scanning task in response to the determined change event.

16. The apparatus according to claim 15, wherein the scheduling system is configured to schedule, in response to the determined change event, at least one of a full file system scan, a partial file system scan, a scan for public keys, a scan for access-granting public keys, and a scan for private keys.

17. The apparatus according to claim 10, configured to continuously monitor the at least one file system.

18. The apparatus according to claim 10, comprising a kernel subsystem or an entity configured to monitor file system journals.

19. The apparatus according to claim 10, wherein the change event comprises at least one of a file creation event, a file deletion event and a file modification event.

20. A computerized monitoring system for monitoring file systems, comprising:
- a file system monitor configured to monitor at least one file system and determine, based on the monitoring, a change event in the at least one monitored file system;
- a notification system configured to provide a notification in response to the determined change event; and
- a scheduling system configured to schedule, in response to the notification, a file system scan for determining at least one security protocol key in the at least one monitored file system.

* * * * *

UNITED STATES PATENT AND TRADEMARK OFFICE
CERTIFICATE OF CORRECTION

PATENT NO. : 10,616,237 B2
APPLICATION NO. : 15/977297
DATED : April 7, 2020
INVENTOR(S) : Tommi Linnakangas et al.

Page 1 of 1

It is certified that error appears in the above-identified patent and that said Letters Patent is hereby corrected as shown below:

On the Title Page

Page 2, Column 2, item (56) Other Publications, Line 18:
Please delete "Entgerprise" and insert --Enterprise--

Signed and Sealed this
Twenty-fifth Day of August, 2020

Andrei Iancu
*Director of the United States Patent and Trademark Office*